United States Patent
McCroskey et al.

(10) Patent No.: US 7,814,369 B2
(45) Date of Patent: Oct. 12, 2010

(54) SYSTEM AND METHOD FOR DETECTING COMBINATIONS OF PERFOMANCE INDICATORS ASSOCIATED WITH A ROOT CAUSE

(75) Inventors: Robert C. McCroskey, Burnsville, MN (US); Kyusung Kim, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 286 days.

(21) Appl. No.: 12/138,254

(22) Filed: Jun. 12, 2008

(65) Prior Publication Data

US 2009/0313505 A1   Dec. 17, 2009

(51) Int. Cl.
*G06F 11/00* (2006.01)
(52) U.S. Cl. .......................................... 714/26; 714/47
(58) Field of Classification Search ................... 714/26, 714/47
See application file for complete search history.

(56) References Cited

U.S. PATENT DOCUMENTS

| | | | |
|---|---|---|---|
| 5,463,768 A | | 10/1995 | Cuddihy et al. |
| 5,661,668 A | * | 8/1997 | Yemini et al. ............... 702/186 |
| 5,845,272 A | * | 12/1998 | Morjaria et al. ............... 706/50 |
| 6,343,236 B1 | * | 1/2002 | Gibson et al. ................. 700/79 |
| 6,415,395 B1 | | 7/2002 | Varma et al. |
| 6,615,367 B1 | | 9/2003 | Unkle et al. |
| 6,634,000 B1 | * | 10/2003 | Jammu et al. .................. 714/37 |
| 7,100,084 B2 | * | 8/2006 | Unkle et al. ................... 714/26 |
| 7,398,423 B2 | * | 7/2008 | Reaume et al. ............... 714/23 |
| 2004/0003318 A1 | | 1/2004 | Felke et al. |
| 2004/0153689 A1 | * | 8/2004 | Assaf ............................. 714/1 |
| 2006/0026467 A1 | * | 2/2006 | Nehab et al. .................. 714/38 |
| 2007/0050679 A1 | * | 3/2007 | Reddy .......................... 714/38 |
| 2007/0185854 A1 | * | 8/2007 | D'Eon et al. .................... 707/4 |
| 2008/0059120 A1 | | 3/2008 | Xiao et al. |
| 2008/0104470 A1 | | 5/2008 | Benvenga |

OTHER PUBLICATIONS

EP Search Report, EP 09162314.0-1225/2141595 dated Jul. 28, 2010.

* cited by examiner

*Primary Examiner*—Marc Duncan
(74) *Attorney, Agent, or Firm*—Ingrassia Fisher & Lorenz, P.C.

(57) ABSTRACT

Methods and system are provided for detecting combinations of performance indicators that are associated with a root cause. The method comprises storing a plurality of error codes, each representative of at least one performance indicator, storing descriptive data associated with each of the plurality of error codes, storing a plurality of root causes, each associated with descriptive data that corresponds to the descriptive data of the plurality of error codes, identifying the error codes from the plurality of error codes that correspond to at least one of the plurality of root causes, and analyzing the error codes that correspond to at least one root cause to determine combinations of performance indicators that are associated with the root cause.

20 Claims, 5 Drawing Sheets

| ERROR CODE | PART NO. | SERIAL NO. | TIME |
|---|---|---|---|
| A,B,D,E | M1 | S1 | 8/29/2002 9:30 AM |
| D,E,F | M1 | S24 | 5/05/2002 3:30 PM |
| B,G,W | M1 | S2 | 10/15/2003 9:45 AM |
| P,Q,R | M1 | S27 | 10/20/2003 12:45 PM |
| A,D | M1 | S3 | 11/11/2003 9:45 AM |
| T,R,Z | M1 | S28 | 11/20/2003 3:45 PM |
| A,C,G | M1 | S4 | 2/12/2004 10:00 AM |
| L,O | M1 | S29 | 2/15/2004 11:05 AM |
| A,G | M1 | S5 | 2/27/2004 9:30 AM |
| A,B,D,J | M1 | S6 | 4/25/2004 10:45 AM |
| R,T | M1 | S7 | 6/02/2004 11:45 AM |
| B,D | M1 | S2 | 8/20/2004 9:30 AM |
| U,X | M1 | S30 | 8/21/2004 10:30 AM |
| A,C,D | M1 | S8 | 9/20/2004 11:00 AM |
| H,W,J | M1 | S9 | 10/3/2004 10:00 AM |
| W,Z | M1 | S10 | 11/1/2004 10:00 AM |
| A,D,K | M1 | S11 | 11/15/2004 10:30 AM |
| H,U,Y | M1 | S12 | 12/20/2004 11:00 AM |

FIG. 3

| ROOT CAUSE | PART NO. | SERIAL NO. | TIME | |
|---|---|---|---|---|
| CAPACITOR FAILURE | M1 | S1 | 9/30/2002 | 10:45 AM |
| CAPACITOR FAILURE | M1 | S40 | 10/15/2002 | 4:30 PM |
| POWER SUPPLY FAILURE | M1 | S2 | 10/20/2003 | 3:45 PM |
| CAPACITOR FAILURE | M1 | S3 | 11/28/2003 | 9:45 AM |
| POWER SUPPLY FAILURE | M1 | S41 | 12/10/2003 | 11:45 AM |
| POWER SUPPLY FAILURE | M1 | S4 | 3/15/2004 | 10:00 AM |
| NO FAULT FOUND | M1 | S5 | 3/23/2004 | 9:30 AM |
| NO FAULT FOUND | M1 | S50 | 4/22/2004 | 1:45 PM |
| CAPACITOR FAILURE | M1 | S6 | 5/10/2004 | 10:45 AM |
| NO FAULT FOUND | M1 | S7 | 6/28/2004 | 11:45 AM |
| NO FAULT FOUND | M1 | S2 | 9/18/2004 | 9:30 AM |
| CAPACITOR FAILURE | M1 | S51 | 9/20/2004 | 9:50 AM |
| CAPACITOR FAILURE | M1 | S8 | 10/3/2004 | 9:45 AM |
| POWER SUPPLY FAILURE | M1 | S9 | 11/2/2004 | 10:00 AM |
| NO FAULT FOUND | M1 | S60 | 11/7/2004 | 3:00 PM |
| NO FAULT FOUND | M1 | S10 | 12/2/2004 | 10:30 AM |
| CAPACITOR FAILURE | M1 | S11 | 12/20/2004 | 11:00 AM |
| POWER SUPPLY FAILURE | M1 | S12 | 1/5/2005 | 9:30 AM |

FIG. 4

| ROOT CAUSE | ERROR CODE |
|---|---|
| CAPACITOR FAILURE | A, B, D, E |
| CAPACITOR FAILURE | A, D |
| CAPACITOR FAILURE | A, B, D, J |
| CAPACITOR FAILURE | A, C, D |
| CAPACITOR FAILURE | A, D, K |
| POWER SUPPLY FAILURE | B, G, W |
| POWER SUPPLY FAILURE | A, C, G |
| POWER SUPPLY FAILURE | H, W, J |
| POWER SUPPLY FAILURE | H, U, Y |
| NO FAULT FOUND | A, G |
| NO FAULT FOUND | R, T |
| NO FAULT FOUND | B, D |
| NO FAULT FOUND | W, Z |

FIG. 5

SYSTEM AND METHOD FOR DETECTING COMBINATIONS OF PERFOMANCE INDICATORS ASSOCIATED WITH A ROOT CAUSE

TECHNICAL FIELD

The present invention generally relates to diagnostics for an electronic system, and more particularly relates to a system and method for detecting combinations of performance indicators associated with a root cause.

BACKGROUND

Modern complex electronic systems, such as the types that are used in avionics, typically have extensive self-test capabilities called Built-In-Test (BIT). BIT allows these systems to test the functionality of their critical components and to report negative test results in the form of a BIT error code. A technician or other personnel may decide whether the electronic system is in need of any maintenance based on these BIT error codes. BIT and other error code generating procedures allow electronic systems to provide notification of any operational failures, thus permitting these issues to be addressed and corrected.

One issue that often arises with electronic systems that are configured with BIT is a high rate of false alarms. A false alarm occurs when the electronic system reports one or more negative BIT error codes but there is no fault found when the electronic system is taken to a repair facility and subject to diagnostic procedures. In such circumstances, these BIT false alarms might result in the removal of an electronic system that is functioning properly. In extreme cases, where the use of BIT on an electronic system results in a high rate of BIT false alarms, the utility of this self-testing capability in discovering operational failures of an electrical system is reduced.

Further, a given electronic system may comprise a plurality of subcomponents, each configured to test their own functionality and report the results in the form of a BIT error code. In this case, when the electronic system experiences a system level fault, such as a power failure, a large number of BIT error codes may generated by each one of these subcomponents and reported by the electronic system. This may result in a large number of BIT error codes thus making it difficult to diagnose the operational failure.

Accordingly, it is desirable to provide a system and method for identifying specific failure modes for an electronic device based on an error code. In addition, it is also desirable to identify false alarms for an electronic device based on an error code. Furthermore, other desirable features and characteristics of the present invention will become apparent from the subsequent detailed description of the invention and the appended claims, taken in conjunction with the accompanying drawings and this background of the invention.

BRIEF SUMMARY

A method is provided for detecting combinations of performance indicators that are associated with a root cause. The method comprises storing a plurality of error codes, each representative of at least one performance indicator, storing descriptive data associated with each of the plurality of error codes, storing a plurality of root causes, each associated with descriptive data that corresponds to the descriptive data of the plurality of error codes, identifying the error codes from the plurality of error codes that correspond to at least one of the plurality of root causes, and analyzing the error codes that correspond to at least one root cause to determine combinations of performance indicators that are associated with the root cause.

BRIEF DESCRIPTION OF THE DRAWINGS

The present invention will hereinafter be described in conjunction with the following drawing figures, wherein like numerals denote like elements.

FIG. 3 is a table representing an exemplary error code database;

FIG. 4 is a table representing an exemplary root cause database; and

FIG. 5 is a table representing an exemplary error code/root cause database.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
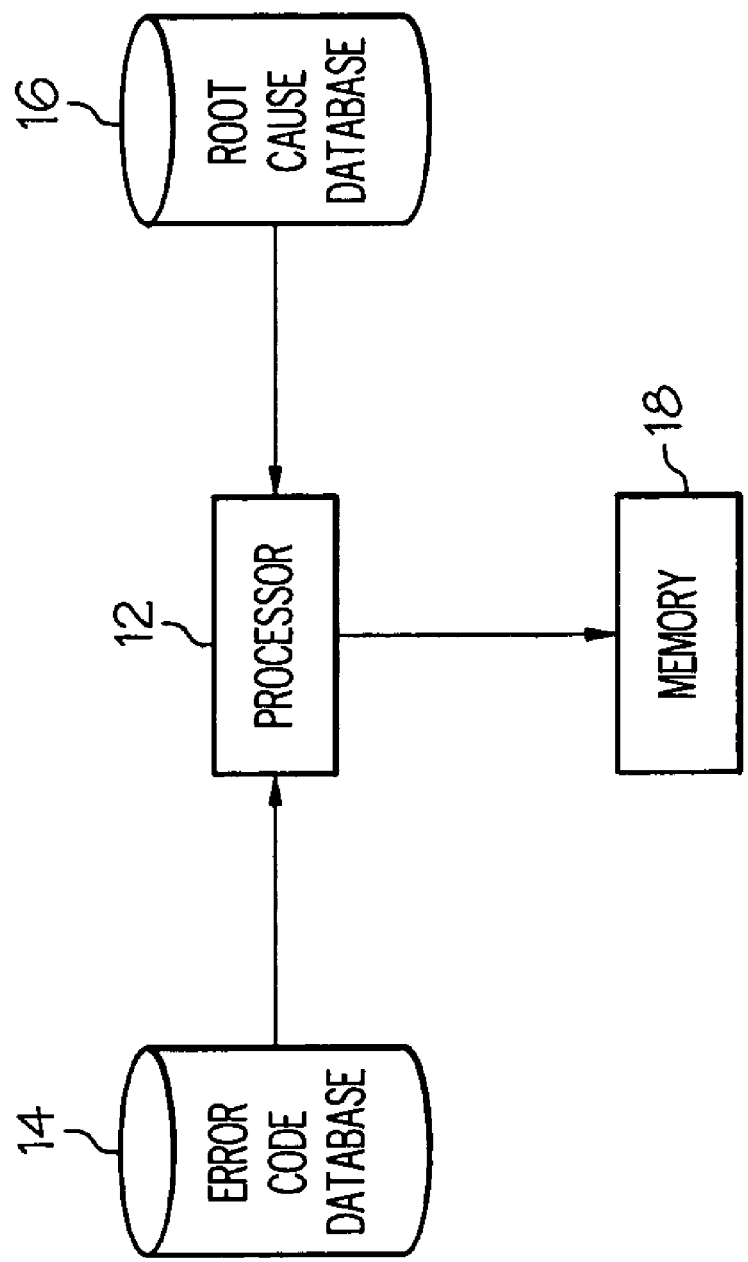
FIG. 1 is a block diagram of an exemplary diagnostic system for detecting combinations of performance indicators that correspond to a root cause.

FIG. 1 is a block diagram of an exemplary system 10 for detecting combinations of performance indicators that correspond to a root cause. As used herein, the term "performance indicator" refers to any symbol that conveys information regarding the operational state of an electronic system. The system 10 comprises a processor 12 that receives data from an error code database 14 and a root cause database 16. The processor 12 then detects combinations of performance indicators that correspond to at least one root cause and stores this information in memory 18.

The error code database 14 comprises a plurality of error codes and descriptive data. As used herein, the term "error code" refers to a collection of one or more performance indicators. The error codes are generated by an electronic system to provide notification of one or more failures in its operational state. For example, the electronic system may be configured to test its own functionality (e.g., Built-in-Test) and report any negative test results in the form of one or more BIT error codes. In this case, each test may be associated with a symbol (e.g., "A", "B", "C", etc.) so that the BIT error code comprising performance indicators A, B, D indicates that the electronic system received negative results for those tests. The electronic system may be any electronic system that is capable of generating data regarding its operational state. In one embodiment, the electronic system comprises a Line Replaceable Unit (LRU) for use on an aircraft. An aircraft may include a plurality of distinct LRUs that can be easily removed and replaced when an operational failure is detected.

The root cause database 16 includes a plurality of root causes and descriptive data that uniquely identifies each root cause. As used herein, the term "root cause" refers to a general description of one of the primary failure modes for an electronic system. The root causes are not specific descriptions of the cause of a failure of an electronic system, but rather broad descriptions into which one or more specific failures may be categorized. For example, if an electronic system fails because one or more of its capacitors is faulty, the root cause for that failure might be "Capacitor Failure" without regard for the identity of the faulty capacitor or the nature of its operational failure. Other possible root causes include "Power Supply Failure" to identify instances in which an electronic system failed due to a fault in its power supply and "No Fault Found" to identify instances in which an electronic system generated an error code, but no operational failure was discovered. Although three exemplary root causes are described above, it should be noted that an electronic system may have many root causes that are different from and/or in addition to those described.

In addition, the error code database 14 and the root cause database 16 include descriptive data. The content of the descriptive data is sufficient to uniquely identify each error code and a corresponding root cause as further described below. For example, the descriptive data may comprise a module identifier. The module identifier may be any value or collection of values (e.g., a part number and a serial number) that uniquely identify a specific electronic system. In addition, the descriptive data may also include a timestamp. The timestamps in the error code database 14 may correspond to the date and time that the error code was reported whereas the timestamps in the root cause database 16 may correspond to the date and time that the electronic system was received, or repaired, at the repair facility. These timestamps may be used to differentiate between error codes and root causes that have the same module identifier in the case where an electronic system generates more than one of the error codes stored in the error code database 14.

The processor 12 may comprise one or more microprocessors or any other type of processing unit that is known by one who is skilled in the art. As further described below, the processor 12 receives data from the error code database 14 and the root cause database 16 and associates corresponding error codes and root causes with one another based on the descriptive data. Processor 12 then analyzes the associated error codes and root causes to detect combinations of performance indicators that are associated with at least one root cause and stores this information in memory 18.

Figure 2:
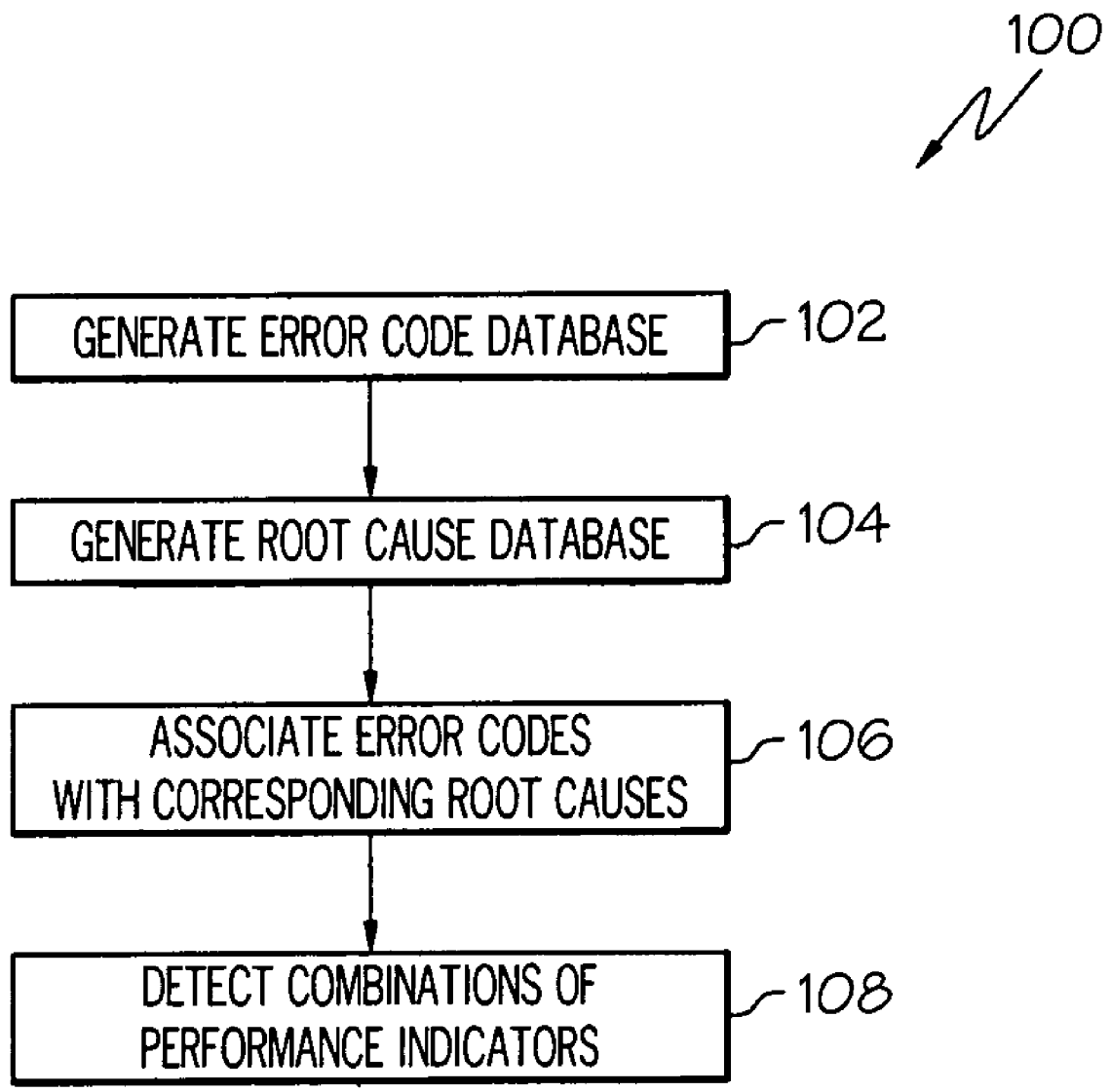
FIG. 2 is a flowchart of an exemplary method for detecting combinations of performance indicators that correspond to a specific root cause.

FIG. 2 depicts a flowchart of an exemplary method 100 for detecting combinations of performance indicators that correspond to at least one root cause. As depicted, an error code database (e.g., the error code database 14 of FIG. 1) is generated during step 102, and a root cause database (e.g., the root cause database 16 of FIG. 1) is generated during step 104. Next, the error codes in the error code database are associated with their corresponding root cause from the root cause database (step 106). Finally, the associated error codes and root causes are analyzed to detect combinations of performance indicators that are associated with at least one root cause (step 108). It is to be understood that certain of the steps described herein in conjunction with FIG. 2 may be performed in different orders than the illustrated and described order, and/or some steps may be performed in parallel with each other.

The error code database is generated during step 102. As described above, the error code database comprises a plurality of error codes and their associated descriptive data. The information in the error code database is obtained from historical error code information generated by a specific type of electronic system. For example, a particular type of LRU on an aircraft that is equipped to test its critical components (e.g., using BIT) may report one or more failed tests in the form of a BIT error code. These BIT error codes are stored along with additional information, including a module identifier for the LRU and a timestamp representing the date and time that the BIT error code was generated, as error code information. Similar error code information for LRUs of the same type that have generated BIT error codes during a specific time period is compiled as historical error code information during step 102.

The error codes and descriptive data are then extracted from the historical error code information, if necessary, to create the error code database. For example, the historical error code information may be stored as one or more HTML documents and/or in more than one database. In this case, a processor (e.g., the processor 12 of FIG. 1) parses the historical error code information and extracts the error codes and the descriptive data. Each error code and its associated descriptive data are then stored in the error code database. It should be noted that in some embodiments the historical error code information may already be in a form that is suitable for use by method 100 (e.g., because the error codes and associated descriptive data are may be easily accessed) so that no further processing is necessary.

FIG. 3 is a depiction of a table representing an exemplary error code database 200. The error code database 200 comprises a plurality of error codes 202, module identifiers 204, and timestamps 206. The error codes 202 are generated by an electronic device and each comprise at least one performance indicator. In the illustrated embodiment, the error codes 202 are BIT error codes and the performance indicators identify tests that were executed by the electronic system. The module identifiers 204 uniquely identify the electronic system that generated the corresponding error code 202. As illustrated, each module identifier comprises both a part number and a serial number. Finally, the timestamps 206 comprise the date and time that each corresponding error code 202 was recorded.

Returning to FIG. 2, during step 104 the root cause database is generated. As described above, the root cause database comprises a plurality of root causes and their associated descriptive data. The root cause database is generated from historical repair data from one or more repair facilities. For example, a technician may remove an LRU from an aircraft and send it to a repair facility if they believe that it is not functioning properly (e.g., if it has generated a BIT error code or if such removal is required by trouble shooting procedures). At the repair facility, information regarding any operational failure of the LRU is recorded along with additional data, such as the module identifier for the LRU and a timestamp representing the date and time that the LRU arrived, or was repaired, as repair data. Over time, a large amount of historical repair data is generated describing the operational failure for many LRUs. During step 104, this historical repair data is compiled.

The historical repair data is analyzed to determine the primary failure modes for the electronic system. Root causes are generated to describe each one of these primary failure modes. The choice of the type and number of root causes to generate will depend on the specific electronic system as well as other factors, such as amount of historical repair data that is available and the level of detail that is required to adequately describe the primary failure modes of the electronic system. For example, in some embodiment the primary failure modes of the electronic system may be adequately described using general root causes (e.g., "Capacitor Failure"), while in other embodiments more specific root causes (e.g., "RF Capacitor Failure" or "C123 Capacitor Failure") may be required. Each record of the historical repair data is analyzed and assigned a root cause based on the operational failure that was recorded at the repair facility. For example, the root cause "Capacitor Failure" might be associated with each record of the historical repair data for which the operational failure indicated a fault with a capacitor of the electronic system. Further, the root cause "Power Supply Failure" might be associated with each record of the historical repair data for which the operational failure indicated a fault with the power supply of the electronic system. On the other hand, the root cause "No Fault Found" would be associated with each record of the historical error code information for which no operational failure could be diagnosed at the repair facility. In this sense, root cause "No Fault Found" is distinct from the other root causes in that it is not indicative of a particular operational failure of the electronic system.

FIG. 4 is a depiction of a table representing an exemplary root cause database 210. As depicted, the root cause database 210 comprises a plurality of root causes 212, module identifiers 214, and timestamps 216. The root causes 212 describe an operational failure of an electronic system and are generated as described above. The module identifiers 214 correspond to the electronic system. The timestamps 216 correspond to one of the root causes and represent the time that the electronic system arrived, or was repaired, at the repair facility.

With reference to FIGS. 3 and 4, it should be noted that many of the error codes 202 in the error code database 200 correspond to specific root causes in the root cause database 210. This occurs where the electronic system that generated an error code 202 was repaired at a repair facility and assigned a root cause 212. Returning to FIG. 2, during step 106 these corresponding error codes and root causes are identified and associated with one another.

FIG. 5 is a depiction of a table representing an exemplary error code/root cause database 220 for associating a plurality of root causes 222 with a plurality of error codes 224. With reference to FIGS. 3-5, table 220 is generated by comparing the module identifier 204 for each error code 202 in the error code database 200 to the module identifier 214 for each root cause 212 in the root cause database 210. If a match is identified, the corresponding error code 202 and root cause 212 are associated in the error code/root cause database 220.

For example, during step 106 (FIG. 2) the processor identifies the first module identifier M1:S1 (e.g., Part No: M1 and Serial No. S1) that corresponds to error code "A, B, D, E" in the error code database 200 and searches for that module identifier in the root cause database 210. The processor determines that M1:S1 corresponds to root cause "Capacitor Failure" in the root cause database 210 and associates error code "A, B, D, E" with root cause "Capacitor Failure." In some embodiments, the processor may also determine whether the difference between the timestamp (e.g., 8/29/2002 9:30 AM) associated with error code "A, B, D, E" and the timestamp (e.g., 9/30/2002 10:45 AM) associated with the corresponding root cause "Capacitor Failure" exceeds a predetermined threshold (e.g., one year). If the difference between the two timestamps is less than the predetermined threshold then error code "A, B, D, E" is associated with root cause "Capacitor Failure." On the other hand, if the difference between the two timestamps is equal to or greater than the predetermined time period then the error code and root cause are not associated with one another because they are too distant in time and are most likely unrelated. Finally, the processor stores the associated error code 224 and root cause 222 in the error code/root cause database 220.

Next, the processor identifies module identifier M1:S24 that corresponds to error code "D, E, F" in the error code database 200 and searches for that module identifier in the root cause database 210. In this case, M1:S24 is not found in the root cause database 210. Thus, the processor does not store the error code "D, E, F" in the error code/root cause database 220.

The processor then identifies the next module identifier M1:S2 that corresponds to error code "B, G, W" in the error code database 200 and searches for that module identifier in the root cause database 210. As shown, M1:S2 corresponds to two root cause candidates "Power Supply Failure" and "No Fault Found" in the root cause database 210. In this case, the processor compares the timestamp 206 for error code "B, G, W" (e.g., 10/15/2003 9:45 AM) to the timestamps 216 for both root cause candidates to determine which is closer. In this case, the timestamp for the root cause "Power Supply Failure" (e.g., 10/20/2003 3:45 PM) is closer and the processor associates the error code "B, G, W" with the root cause "Power Supply Failure" in the error code/root cause database 220. In addition, in some embodiments the processor determines the difference between the timestamp for error code "B, G, W" and the timestamp for the corresponding root cause "Power Supply Failure" to ensure that it does not exceed a predetermined threshold. This process continues until each associated error code 202 and root cause 212 have been detected and stored in the error code/root cause database 220.

Referring now to FIGS. 2 and 5, during step 108 the processor analyzes the associated error codes and root causes to detect combinations of performance indicators that are associated with at least one root cause. To accomplish this, the processor isolates the error codes that are associated with a specific root cause. For example, in the illustrated embodiment the error code/root cause database 220 is sorted with respect to the root cause 222. Consequently, the error codes 224 for the root cause "Capacitor Failure" are shown in a first group 226, the error codes 224 for the root cause "Power Supply Failure" are shown in a second group 228, and error codes 224 for the root cause "No Fault Found" are shown in a third group 230. The processor then analyzes the error codes that correspond with a first root cause (e.g., the first group 226 of error codes) to detect combinations of performance indicators associated with those error codes. Next, the processor determines the strength of each combination of performance indicators as a predictor of the first root cause by determining whether they also occur in the error codes for the other root causes (e.g., the second group 228 and the third group 230 of error codes). If a combination of performance indicators is a strong predictor of a particular root cause, then it can be used in the future to identify error codes that correspond to that root cause.

The strength of a combination of performance indicators as predictor for a specific root cause is expressed as a percentage representing how often that combination of performance indicators is found in error codes for the root cause (hereinafter referred to as the "detection rate") and a percentage representing how often the same combination is found in error codes that correspond to the other root causes (hereinafter referred to as the "erroneous detection rate"). A combination of performance indicators that has a high detection rate for a particular root cause and a low erroneous detection rate would be considered a strong predictor. Conversely, a combination that has a low detection rate for a particular root cause and a high erroneous detection rate would be a weak predictor.

For example, during step 108, the processor would analyze the error codes for the first group 226 and detect any combinations of performance indicators that are associated with each of these error codes. In the depicted embodiment, combination "A & D" is associated with each of the error codes in group 226. The processor then analyzes the error codes for groups 228 and 230 and determines whether the combination A & D is present in those error codes. In this case, A & D is not present in any of the error codes for groups 228 and 230 and the processor determines that combination of performance indicators A & D has a 100% detection rate and a 0% erroneous detection rate for root cause "Capacitor Failure."

Similarly, the processor may analyze the error codes for the second group 228 and detect that the combination of performance indicators G|H corresponds to each. The processor then analyzes the error codes for groups 226 and 230 to determine if combination G|H corresponds to any of the error codes in that group. In this case, performance indicator G occurs in one of the error codes associated with root cause "No Fault Found" or in one out of the nine error codes in groups 226 and 230. Thus, in this case the processor determines that the combination of performance indicators G|H has a 100% detection rate and an 20% (e.g., one-fifth) erroneous detection rate for the root cause "Power Supply Failure."

A similar process may be used to analyze the error codes for the third group 230 that are associated with root cause "No Fault Found." Any combination of performance indicators that are identified as predictors for root cause "No Fault Found" may be used in the future to identify instances in which an electronic system generates a false alarm even though it has no operational failure. This could prevent the removal and replacement of an electronic system that is functioning properly, which would reduce the costs associated with maintaining the electronic system.

It should be noted that the strength or weakness of a combination of performance indicators as a predictor of a root cause will also depend on a plurality of other factors. One such factor is the size and completeness of the data in the error code/root cause database 220. In general, combinations of performance indicators that are determined by analyzing an error code/root cause database 220 containing a large amount of data or a substantial portion of the error codes that have been generated by a certain type of electronic device will be stronger predictors than combinations of performance indicators that are determined by analyzing an error code/root cause database 220 that includes a small amount of data or a small portion of the error codes that have been generated by the type of electronic system in question.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. Method for detecting combinations of performance indicators that are associated with a root cause, the method comprising:
   storing a plurality of error codes, each representative of at least one performance indicator;
   storing descriptive data associated with each of the plurality of error codes, the descriptive data comprising a plurality of module identifiers where each module identifier of the plurality corresponds to a different one of the plurality of error codes;
   storing a plurality of root causes, each associated with descriptive data that corresponds to the descriptive data of the plurality of error codes;
   identifying error codes from the plurality of error codes that correspond to at least one of the plurality of root causes; and
   analyzing error codes that correspond to at least one root cause of the plurality to determine combinations of performance indicators that are associated with the root cause.

2. The method of claim 1, wherein the step of storing the plurality of error codes further comprises:
   receiving historical error code information comprising the error codes and corresponding descriptive data;
   extracting each error code from the historical error code information; and
   storing each error code.

3. The method of claim 2, wherein the step of storing descriptive data further comprises:
   extracting the corresponding descriptive data for each error code from the historical error code information; and
   storing the corresponding descriptive data.

4. The method of claim 1, wherein the step of storing the plurality of root causes further comprises:
   receiving historical repair data comprising a plurality of operational failures and corresponding descriptive data;
   assigning each of the plurality of operational failures to a root cause; and
   storing each root cause and its corresponding descriptive data.

5. The method of claim 1, wherein:
   the step of storing the plurality of root causes further comprises:
      storing a plurality of module identifiers, each module identifier of the plurality corresponding to a different one of the plurality of root causes; and
   the step of identifying the error codes from the plurality of error codes that correspond to at least one of the plurality of root causes further comprises identifying error codes and root causes that have the same module identifiers.

6. The method of claim 1, wherein:
   the step of storing descriptive data further comprises storing a plurality of timestamps that each correspond to a different one of the plurality of error codes;
   the step of storing the plurality of root causes further comprises:
      storing a plurality of module identifiers and timestamps that correspond to the plurality of root causes
   the step of identifying the error codes from the plurality of error codes that correspond to at least one of the plurality of root causes further comprises identifying error codes and root causes that have the same module identifiers and wherein the difference between the timestamp for an error code and the timestamp for a root cause does not exceed a predetermined threshold.

7. The method of claim 1, wherein the step of analyzing further comprises:
   identifying the error codes that are associated with a first root cause;
   analyzing each of the identified error codes to detect combinations of performance indicators that are associated with the first root cause; and
   analyzing each of the remaining error codes to detect whether they include one of the detected combinations of performance indicators.

8. The method of claim 7, further comprising: determining a first percentage representing how often each of the error codes that are associated with the first root cause include a first combination of performance indicators; and determining a second percentage representing how often each of the remaining error codes include the first combination of performance indicators.

9. The method of claim 8, further comprising: determining the strength of the first combination of performance indicators as a predictor of the first root cause based on the first percentage and the second percentage.

10. A method for detecting combinations of Built-in-Test error codes generated by an electronic system in an aircraft and associated with a root cause, the method comprising: storing a plurality of Built-in-Test error codes, each representative of at least one performance indicator; storing descriptive data associated with each of the plurality of Built-in-Test error codes; storing a plurality of root causes, each associated with descriptive data that corresponds to the descriptive data of the Built-in-Test error codes; storing a plurality of module identifiers wherein each corresponds to a different one of the plurality of root causes; identifying Built-in-Test error codes from the plurality of Built-in-Test error codes that correspond to at least one of the plurality of root causes; and analyzing the Built-in-Test error codes that correspond to at least one root cause to determine combinations of performance indicators that are associated with a predetermined root cause.

11. The method of claim 10, wherein: the step of storing descriptive data further comprises storing a plurality of module identifiers that each correspond to a different one of the plurality of Built-in-Test error codes; the step of identifying the Built-in-Test error codes from the plurality of Built-in-Test error codes that correspond to at least one of the plurality of root causes further comprises identifying Built-in-Test error codes and root causes that have the same module identifiers.

12. The method of claim 10, wherein: the step of storing descriptive data further comprises storing a plurality of module identifiers and timestamps that each correspond to a different one of the plurality of Built-in-Test error codes; the step of storing the plurality of root causes further comprises
storing a plurality of timestamps that each correspond to a different one of the plurality of root causes the step of identifying the Built-in-Test error codes from the plurality of Built-in-Test error codes that correspond to at least one of the plurality of root causes further comprises identifying Built-in-Test error codes and root causes that have the same module identifiers and wherein the difference between the timestamp for a Built-in-Test error code and the timestamp for a root cause does not exceed a predetermined threshold.

13. The method of claim 10, wherein the step of analyzing further comprises: identifying the Built-in-Test error codes that are associated with a first root cause; analyzing each of the identified Built-in-Test error codes to detect combinations of performance indicators that are associated with a root cause; and analyzing each of the remaining Built-in-Test error codes to detect whether they contain one of the detected combinations of performance indicators.

14. The method of claim 13, further comprising: determining a first percentage representing how often each of the Built-in-Test error codes associated with the first root cause include a first combination of performance indicators; and determining a second percentage representing how often each of the remaining Built-in-Test error codes include the first combination of performance indicators.

15. The method of claim 14, further comprising: determining the strength of the first combination of performance indicators as a predicator of the first root cause based on the first percentage and the second percentage.

16. A system for detecting patterns of combinations of performance indicators associated with a predetermined root cause, the system comprising: an error code database comprising a plurality of error codes, each representative of at least one performance indicator, and descriptive data for each error code, wherein the descriptive data of the error code database and the root cause database further comprises a plurality of module identifiers; a root cause database comprising a plurality of root causes, each associated with descriptive data that corresponds to the descriptive data of the plurality of error codes; and a processor coupled to the error code database and the root cause database, the processor configured to:
 identify error codes from the error code database that correspond to at least one of the plurality of root causes from the root cause database; and
 analyze error codes that correspond to at least one root cause to determine combinations of performance indicators that are associated with the predetermined root cause.

17. The system of claim 16, wherein: the descriptive data of the error code database and the root cause database further comprises a plurality of timestamps; and the processor is further configured to identify error codes from the error code database and root causes from the root cause database that have the same module identifier and wherein the difference between a timestamp for an error code and the timestamp for a root cause does not exceed a predetermined threshold.

18. The system of claim 16, wherein the processor is further configured to: identify error codes that correspond to a first root cause; analyze each of the identified error codes to detect combinations of performance indicators associated with the first root cause; and analyze the remaining error codes to detect whether they contain one of the detected combinations of performance indicators.

19. The system of claim 18, wherein the processor is further configured to: determine a first percentage representing how often each of the detected combinations of performance indicators is contained in the error codes for the first root cause; and determine a second percentage representing how often each combination of performance indicators is contained in the error codes for the remaining root causes.

20. The system of claim 19, wherein the processor if further configured to: determine the strength of a combination of performance indicators as an indicator of a root cause based on the first percentage and the second percentage.

* * * * *